United States Patent [19]
Baker et al.

[11] Patent Number: 5,762,177
[45] Date of Patent: Jun. 9, 1998

[54] METHOD AND APPARATUS TO CONVEY FLAT PRODUCTS OF DIFFERENT WIDTHS

[75] Inventors: Richard Lee Baker, Hallstead, Pa.; Wayne David Klossner, Vestal, N.Y.

[73] Assignee: International Business Machines Corporation, Armonk, N.Y.

[21] Appl. No.: 782,181

[22] Filed: Jan. 14, 1997

[51] Int. Cl.$^6$ .................................................. B65G 13/06
[52] U.S. Cl. ........................... 198/781.07; 193/35 R
[58] Field of Search .................. 198/781.07, 781.08, 198/781.09, 781.1, 781.11; 193/35 R, 37, 35 J; 209/670, 672, 673

[56] References Cited

U.S. PATENT DOCUMENTS

| | | | |
|---|---|---|---|
| 1,455,977 | 5/1923 | Wentz | 193/35 R |
| 2,266,506 | 12/1941 | Morse | 193/37 X |
| 2,860,766 | 11/1958 | Welter | 193/37 X |
| 3,108,691 | 10/1963 | Vance | 209/670 X |
| 3,610,406 | 10/1971 | Fleischaver | 198/781.08 X |
| 4,067,428 | 1/1978 | Shuttleworth | 193/35 R |
| 4,352,447 | 10/1982 | Bonaddio et al. | 225/2 |
| 4,448,296 | 5/1984 | Tables | 193/37 X |
| 4,589,811 | 5/1986 | Riccardo et al. | 193/35 R X |
| 5,553,700 | 9/1996 | Smith et al. | 198/781.07 |

OTHER PUBLICATIONS

Brochure of Advanced Chemill Systems re ACS-2001 24 Developer, Etcher, STripper (undated).
Brochure of Marseco re Wet Processing Systems, Surface Finish Systems, Flexible Cleaning Systems (undated).

*Primary Examiner*—James R. Bidwell
*Attorney, Agent, or Firm*—Calfee, Halter & Griswold LLP

[57] ABSTRACT

An improved conveyor is provided which has a plurality of rotatable shafts with a plurality of first disc rollers mounted on each of the shafts for rotation therewith. The first disc rollers are located at a first location on each of the shafts and are spaced from each other at at least a distance X on the shaft. The disc rollers on adjacent shafts are spaced from the disc rollers on each adjacent shaft and are adapted to support and transport a flat product having a width of at least about 2X. A plurality of second rollers are mounted on each of the shafts for rotation therewith at a second location on the shafts. Preferably, each of the second rollers has a length of at least about 2X and preferably a circumference substantially equal to that of the disc rollers. Thus, the second rollers are adapted to support a flat panel product having a width less than about 2X. The conveyor can support and transport both wide and narrow panels and, in some instances, can support both wide and narrow panels at the same time. In one embodiment, the second rollers are provided with edge guides to track the narrow panels thereon.

7 Claims, 2 Drawing Sheets

METHOD AND APPARATUS TO CONVEY FLAT PRODUCTS OF DIFFERENT WIDTHS

FIELD OF THE INVENTION

This invention relates generally to the conveying of flat or panel products on a conveyor, and more particularly to the conveying of flat panel products such as circuit board or circuit card substrates on a conveyor during processing operations in which panels of differing widths can be transported on the same conveyor and preferably can be transported simultaneously on the same conveyor. In even more particular aspects, this invention relates to a conveyor which is especially adapted to transport circuit board substrates during a manufacturing process which can handle circuit board widths from very narrow to very wide, either concomitantly or seriatim, and during which transportation spraying of the product can be accomplished from beneath the conveyor, as well as from the top, and preferably with both the narrow products and the wider products being transported at substantially the same speed.

BACKGROUND INFORMATION

During the processing of substrates in the manufacture of circuit boards or the like, it is often necessary to transport the circuit boards during processing from one process station to another and during processing to provide a rinse or other types of spray against one or both sides of the substrate being transported. Conventionally, this transporting has taken place on disc-type conveyors wherein disc or "donut" rollers are mounted on shafts and which rotate with the shafts. The discs are spaced from each other to thereby allow the spray apparatus to spray material onto the bottom surface of the substrate as it is being transported on the roller. This disc or open construction has several advantages. First, it allows free spraying of the water or other materials being sprayed onto the panels as they are being transported from one location to another. Second, it provides a significant weight reduction and thus significant reduction in power required as opposed to using solid rollers wherein the entire length of each roll shaft acts as a support for the panels. Thus, the disc-type roller is preferred over the solid type. This type of roller works well for wide panels, i.e., panels wherein their width is more than about twice the spacing of the distance between the rollers. If, however, the width of the panels being processed is less than about twice the spacing of the distance between the discs and the roller, the product may not be properly supported and may tilt, twist or jam, causing problems during transport. To overcome this and still use the disc-type conveyor, various types of fixturing have been proposed to support panels having a width narrower than about twice the distance between the disc rollers to prevent this. However, this fixturing is time-consuming, expensive and, in some instances, results in a product not being adequately sprayed.

Therefore, it is desired that a conveyor and method of conveying product be provided which can handle both wide product and narrow product without the necessity of special fixturing and still maintain essentially the open construction to provide for spraying and minimal power usage.

SUMMARY OF THE INVENTION

According to the present invention, an improved conveyor is provided. The conveyor has a plurality of rotatable shafts with a plurality of first disc rollers mounted on each of the shafts for rotation therewith. The first disc rollers are located at a first location on each of the shafts and are spaced from each other at at least a distance X on the shaft. The disc rollers on adjacent shafts are spaced from the disc rollers on each adjacent shaft and are adapted to support and transport a flat product having a width of at least about 2X. A plurality of second rollers are mounted on each of the shafts for rotation therewith at a second location on the shafts. In one embodiment, each of the second rollers has a length of at least about 2X and preferably a circumference substantially equal to that of the disc rollers, although their lengths may be less than 2X if the product mix so dictates, and the circumference also can vary. Thus, the second rollers are adapted to support a flat panel product having a width less than about 2X. Hence, the conveyor can support and transport both wide and narrow panels and, in some instances, can support both wide and narrow panels at the same time. In one embodiment, the second rollers are provided with edge guides to track the narrow panels thereon.

DESCRIPTION OF THE PREFERRED EMBODIMENT

Figure 1:
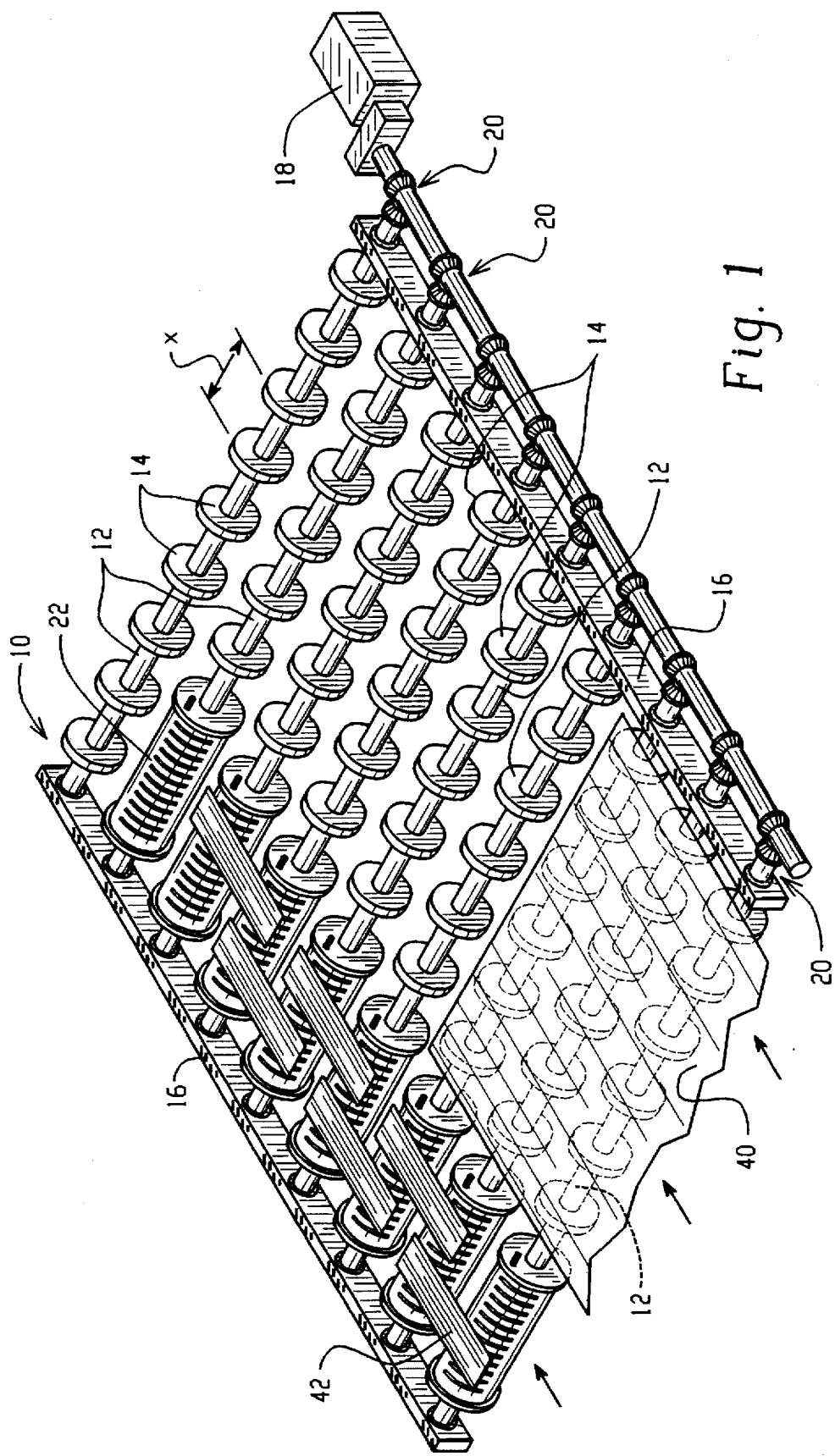
FIG. 1 is a perspective view, somewhat diagrammatic, showing a conveyor system according to this invention.
Figure 2:
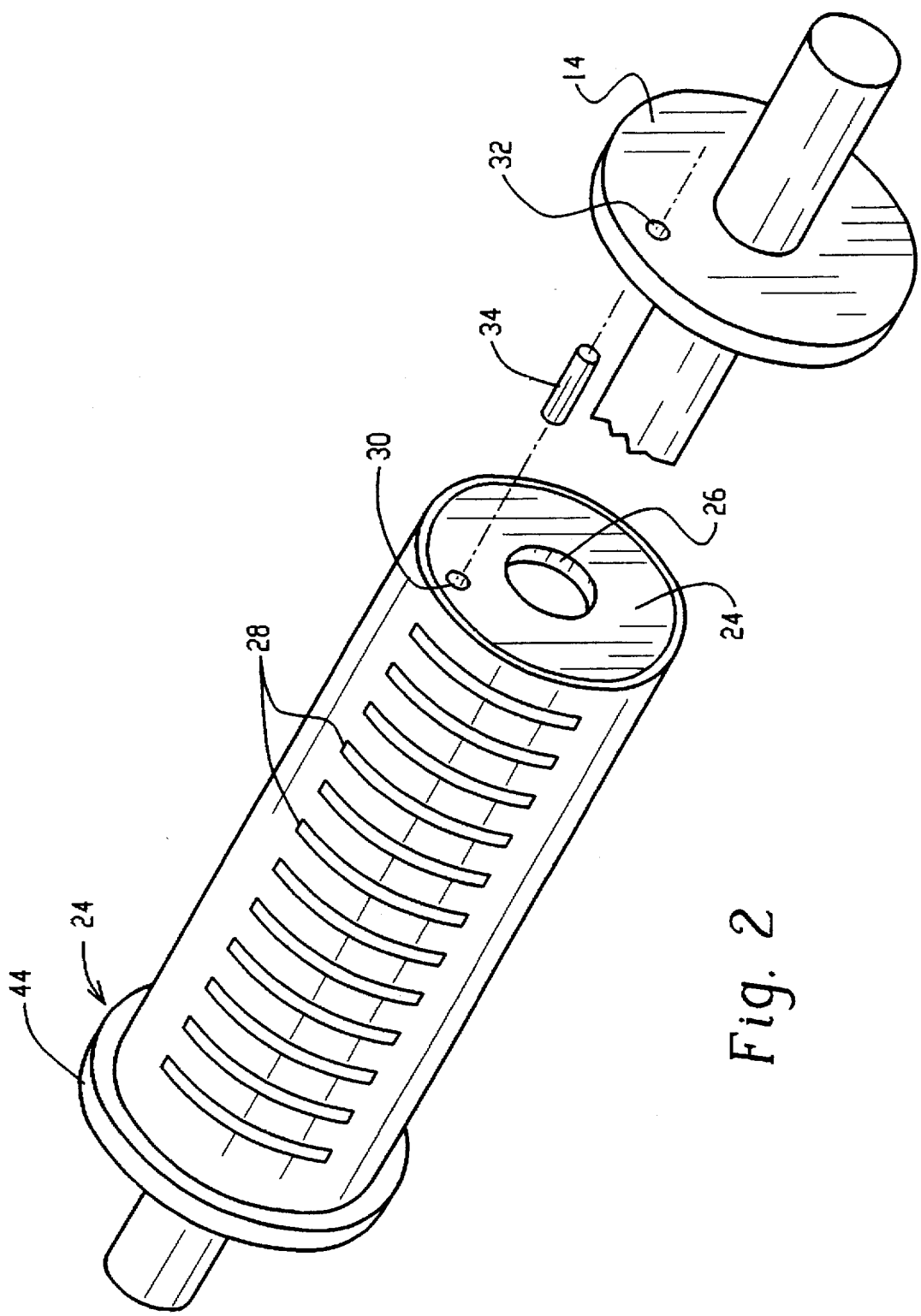
FIG. 2 is an exploded view of a portion of a conveyor system showing the mounting of the longer roll onto the shaft which carries the disc rollers.

Referring now to the drawings, a conveyor system generally designated as 10 is shown somewhat diagrammatically. While the conveyor system 10 includes more than the specific rotating shafts and rollers, the present invention is directed to this aspect of the system and therefore this aspect is depicted, the other parts of the system being conventionally and thus not shown or shown only diagrammatically.

Conveyor system 10 includes a plurality of shafts 12. The shafts 12 have mounted thereon disc rollers 14. While the disc rollers could be keyed or otherwise attached to the shafts 12, in the preferred embodiment the disc rollers are formed of a plastic or elastomeric material such as polyvinylchloride or silicon rubber and press fit onto the shafts 12. The shafts 12 are formed of any corrosion-resistant material, such as hollow stainless steel or fiberglass. The shafts 12 are mounted in bearing 16 at each end thereof and are driven by a motor 18 through gearing shown generally at 20. Such mountings and driver are conventional and thus shown only diagrammatically.

While there is no particular size limitation to the conveyor system of the present invention, it is especially adapted for use in conveying substrates used in the manufacture of circuit boards or the like during processing of the substrate. As such, the total width of the conveyor is conventionally 24 to 32 inches; the drive shafts 12 are conventionally about ⅜ inch in diameter; and the discs on the shafts are typically between ⅞ inch and 1.9 inches in diameter. The spacing "X" between the disc rollers 12 can vary, although typically with the ⅞ inch diameter disc, the spacing X is about 1½ inch between discs center-to-center, and with the 1.9 inch discs, the spacing is typically about 2 inches center-to-center. It is to be understood that these sizes and spacings are typical and illustrative, but other spacings and sizes could be used while still keeping within the aspects of the present invention. The disc rollers 14 on adjacent shafts 12 are preferably in alignment with each other, i.e., in alignment in the direction of the path of travel of the product through the conveyor as indicated by the arrows in FIG. 1, although offset rollers (i.e., not in alignment) can be used. Also, the outer periphery of the rollers 14 preferably are spaced from each other in the direction of the path of travel of the product. This type of conveyor construction as thus far described is conventional and this particular conventional spacing is useful for a product or panel which has a width of at least about twice the distance of the spacing "X" between two adjacent disc rollers 14. If a product or panel with a width less than this spacing "X" is attempted to be put onto the conveyor, it may tilt and jam and fall between the rollers, thus causing a scrapping of the part and, in some instances, the necessity of shutting down the equipment and removing the part.

To remedy this, a second section of the conveyor is provided which is adjacent to the disc rollers 14, which disc rollers constitute a first section of the conveyor. The second section of the conveyor includes tubular rollers 22 which are provided with end caps 24 with openings 26 therein. The end caps 24 fit within the tubular rollers 22 and the openings 26 slide over the ends of the shafts 12. The conveyor can either be constructed in this manner initially or a 24-inch or 32-inch conveyor can be modified by removing the two end discs at the location where the tubular rollers are to be applied and the tubular rollers applied as indicated. Of course, depending upon the desired length of the rollers 22, more than two rollers 14 or even only one roller could be utilized. In some cases, depending upon the spacing on the roller 14 and the length of roller 22, it may not be necessary to remove any of the rollers 14. In either event, the tubular rollers 22 are mounted on the shafts 12 adjacent the first section where the disc rollers 14 end.

The circumference of the tubular rollers 22 preferably is substantially equal to the circumference of the disc rollers 14 for a purpose which will be described presently. The tubular rollers 22 are provided with slots 28 therein to allow the drainage of any liquid that was sprayed onto the product during processing and prevent it from being trapped within the rollers.

The tubular rollers 22 can be mounted by means of the openings 26 in the end caps 24 being press fit onto the shafts 12 or, alternatively, a hole 30 can be provided in end cap 24 and a hole 32 provided in the disc roller 14 adjacent the end cap, and a pin 34 inserted into the holes 30 and 32 to connect the tubular rollers 22 to the disc roller 14 adjacent thereto. This will ensure a positive drive interaction and a positive rotation of the tubular rollers 22 at the same speed of rotation as the disc roller 14 to which it is attached. Tubular rollers 22 are preferably formed of a polyvinylchloride material and the end caps can be formed of stainless steel or polyvinylchloride or any other convenience material.

In operation, the shafts 12 are rotated to rotate the disc rollers 14 and the tubular rollers 22. Since the disc rollers 14 and tubular rollers 22 have essentially the same circumference or diameter, they will transport any material support thereon at essentially the same speed. Thus product parameters and line speeds need not be changed from one to the other product.

Moreover, both the wide and narrow products can be procured concomitantly. The disc rollers 14 are configured such that they can support a wide panel product 40 thereon since the wide panel product has a width of at least twice the distance "X" between two disc rollers 14. However, with a product which has a width less than twice the spacing "X" of the disc rollers 14 and particularly with one having a width less than the spacing "X" of adjacent discs 14 can be transported through the conveyor by supporting them on the tubular rollers 22. Indeed, if the wide panel 14 is not so wide as to overlap the tubular rollers 22, both wide panel product 40 and narrow panel product 42 can be transported by the conveyor at the same time when the rollers 14 and 22 have the same diameter in circumference.

The end caps 24 can be essentially the same diameter as the base of the tubular rolls 22 and inverted therein, in which case a wide panel 40 which is wider than the distance between the opposite end disc rollers 14 could be transported and partially supported on disc rollers 14 and partially supported on tubular rollers 22. However, in many instances it is preferred to provide an edge guide on the edges of the tubular rolls 22 to prevent the narrow panel product 42 from slipping off and becoming entangled in the portion of the conveyor having the disc rollers. In such case, the end caps 24 can be formed with a slightly raised lip as shown at 44 on one end of cap 24. In the disclosed embodiment, this lip projects about 0.060 inches above the outer surface of the tubular rollers 22 and thus provides guidance for tracking the narrow panels 42. However, depending upon product thickness and other design factors, this projection could be more or less. Moreover, if desired, and with certain constructions, it becomes a matter of design choice that the end caps 24 on opposite sides of successive tubular rolls could be of the guide variety having the raised edge 44, whereas the opposite ends could be flush with the surface of the tubular rollers 22. Alternatively, both end caps 24 and each end roller 22 can be provided with raised lips 44.

It is to be understood that spray nozzles or other fixtures such as drying nozzles or the like are normally supported beneath the rollers 14 and 22 and spray water or other processing fluid, air or other gas onto the bottom surface of the panels 40 and 42 as they pass along the conveyor.

Accordingly, the preferred embodiment of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A conveyor comprising:
   at least two shafts;
   a plurality of first rollers spacedly located at a first location on each of said at least two shafts and adapted for having a first article pass thereon, said first rollers each of a first diameter and width;
   at least one second roller located on each of said at least two shafts at a second location adjacent said first location and adapted for having a second article pass thereon, said second rollers each of a second diameter and of a second width greater than said first width of said first roller.

2. The conveyor of claim 1, wherein said second roller is substantially the same diameter as said first rollers.

3. The conveyor of claim 1 wherein at least one of said second rollers has a raised guide at at least one end thereof.

4. The conveyor of claim 1 wherein said first rollers are press fitted onto said shafts.

5. The conveyor of claim 1 wherein a fastener interconnects said second roller to one of said first rollers on at least one shaft.

6. The conveyor of claim 5 wherein said fastener includes a pin engaging each of said second rollers and said one of said first rollers.

7. A conveyor comprising:

a plurality of rotatable shafts;

a plurality of first disc rollers mounted on each of said shafts for rotation therewith at a first location on each of said shafts and being spaced from each other at least a distance of X on said shafts, said disc rollers on adjacent shafts being spaced from the disc rollers on adjacent shafts and being adapted to support and transport a flat product having a width of at least about 2X;

at least one second roller mounted on each of a plurality of said shafts for rotation therewith at a second location on said shafts, said second rollers each having a length of at least about 2X and a circumference substantially equal to that of the disc rollers and being adapted to support a flat product having a width less than about 2X;

whereby products having a width greater than about 2X and less than about 2X can both be run on said conveyor.

* * * * *